US012655941B1

(12) United States Patent
Wessner et al.

(10) Patent No.: US 12,655,941 B1
(45) Date of Patent: Jun. 16, 2026

(54) METHOD FOR FILLING A FUEL GAS TANK WITH FUEL GAS, FUEL GAS TANK, AND FUEL GAS TANK SYSTEM

(71) Applicant: Robert Bosch GmbH, Stuttgart (DE)

(72) Inventors: Jochen Wessner, Esslingen (DE); Martin Katz, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 14 days.

(21) Appl. No.: 18/998,610

(22) PCT Filed: Jul. 4, 2023

(86) PCT No.: PCT/EP2023/068391

§ 371 (c)(1),
(2) Date: Jan. 27, 2025

(87) PCT Pub. No.: WO2024/032980

PCT Pub. Date: Feb. 15, 2024

(30) Foreign Application Priority Data

Aug. 8, 2022 (DE) ..................... 10 2022 208 214.1

(51) Int. Cl.
*F17C 13/02* (2006.01)
*F17C 5/00* (2006.01)

(52) U.S. Cl.
CPC ............ *F17C 5/005* (2013.01); *F17C 13/026* (2013.01); *F17C 2205/0323* (2013.01);
(Continued)

(58) Field of Classification Search
CPC .................... F17C 5/005; F17C 13/026; F17C 2205/0323; F17C 2221/012;
(Continued)

(56) References Cited

U.S. PATENT DOCUMENTS 3,278,728 A * 10/1966 Ragsdale ................. G06G 7/57
702/47
5,259,424 A * 11/1993 Miller ..................... F17C 5/007
702/50
(Continued)

FOREIGN PATENT DOCUMENTS

CN 216619337 A 5/2022
DE 102015212979 A1 3/2016
(Continued)

OTHER PUBLICATIONS

Translation of International Search Report for Application No. PCT/EP2023/068391 dated Oct. 18, 2023 (3 pages).

*Primary Examiner* — Nicolas A Arnett
(74) *Attorney, Agent, or Firm* — Michael Best & Friedrich LLP

(57) ABSTRACT

The invention relates to a method for filling a storage volume (2) of a fuel gas tank (1) with fuel gas, in which the fuel gas is introduced into the storage volume (2) via a fueling path (3) with an integrated tank valve (4) and with the aid of a sensor (5) integrated in the fueling path (3), the temperature of the fuel gas is sensed in the area of a bottleneck point (7), which is formed by the sensor (5) and/or a holding body (8) on which the sensor (5) is mounted.

The invention further relates to a fuel gas tank (1) and a fuel gas tank system having at least one fuel gas tank (1) according to the invention.

13 Claims, 2 Drawing Sheets

(52) U.S. Cl.
CPC .................... *F17C 2221/012* (2013.01); *F17C 2250/0439* (2013.01); *F17C 2250/0443* (2013.01); *F17C 2250/0491* (2013.01); *F17C 2250/0495* (2013.01); *F17C 2250/0636* (2013.01); *F17C 2270/0168* (2013.01); *F17C 2270/0184* (2013.01)

(58) Field of Classification Search
CPC ...... F17C 2250/0439; F17C 2250/0443; F17C 2250/0491; F17C 2250/0495; F17C 2250/0636; F17C 2270/0168; F17C 2270/0184
See application file for complete search history.

(56) References Cited

U.S. PATENT DOCUMENTS

| | | | | |
|---|---|---|---|---|
| 10,948,087 | B2 * | 3/2021 | Hausmann | F16K 1/303 |
| 11,703,186 | B2 * | 7/2023 | McNicholas | B60K 15/03006 180/271 |
| 2010/0032934 | A1 * | 2/2010 | Veenstra | B60K 15/013 141/82 |
| 2010/0206887 | A1 * | 8/2010 | Hashim | G01L 9/0005 73/718 |
| 2012/0267002 | A1 * | 10/2012 | Kittilsen | F17C 13/02 141/4 |
| 2014/0224379 | A1 * | 8/2014 | Adler | F17C 5/06 141/4 |
| 2014/0352817 | A1 * | 12/2014 | Suzuki | F17C 13/04 137/550 |
| 2016/0137056 | A1 * | 5/2016 | Komiya | B60K 15/04 220/581 |
| 2019/0170260 | A1 * | 6/2019 | Hausmann | F17C 13/04 |
| 2021/0003253 | A1 * | 1/2021 | Thieu | F17C 5/06 |
| 2022/0009648 | A1 * | 1/2022 | Clarke | B60L 50/72 |
| 2023/0184343 | A1 * | 6/2023 | Mondinelli | F16K 27/0263 137/625.48 |
| 2025/0347388 | A1 * | 11/2025 | Wessner | F17C 13/026 |

FOREIGN PATENT DOCUMENTS

| | | | |
|---|---|---|---|
| DE | 102017206346 | A1 | 10/2018 |
| DE | 102018121267 | A1 | 3/2020 |
| EP | 2757305 | A1 | 7/2014 |
| EP | 3021031 | A1 | 5/2016 |
| JP | 2007298051 | A | 11/2007 |
| JP | 2013064440 | A | 4/2013 |
| JP | 2016095001 | A | 5/2016 |
| WO | 2021214701 | A1 | 10/2021 |

* cited by examiner

METHOD FOR FILLING A FUEL GAS TANK WITH FUEL GAS, FUEL GAS TANK, AND FUEL GAS TANK SYSTEM

BACKGROUND

The invention relates to a method for filling a fuel gas tank with fuel gas. The fuel gas may be, for example, hydrogen or natural gas. Such fuel gases are needed, for example, by fuel cell vehicles or gas-powered vehicles.

Moreover, the invention relates to a fuel gas tank for a fuel gas tank system and a fuel gas tank system having at least one fuel gas tank according to the invention.

In vehicles that operate on a fuel gas, such as hydrogen, the fuel gas is typically stored under pressure in a fuel gas tank. For hydrogen, the pressure may be up to 70 MPa. The temperature in the fuel gas tank can rise to 85° C. The temperature limit is typically specified by the material of the fuel gas tank, wherein carbon fiber-reinforced plastic ("CRP") is often used as the material. When a CFC material is used, the plastics necessary for the fixation of the carbon fibers, in particular resins, become too soft above 85° C. so that the required strength of the fuel gas tank is no longer ensured.

For example, because hydrogen has a negative Joule-Thomson effect in the relevant temperature range, it heats up when fueling a fuel gas or hydrogen tank. To avoid damage to the fuel gas tank, hydrogen is therefore cooled to about −40° C. prior to fueling. Further, an upwardly kinked tank lance may be used to fill the fuel gas tank, which promotes the mixing of fresh hydrogen with the tank contents and thereby reduces the extent to which the fuel heats up. As a further measure, the tank temperature can be measured or monitored so that if the temperature limit is exceeded, the fueling procedure can be discontinued. In order for the temperature limit to be safely met, the procedure must be terminated early. High measurement tolerances therefore have a negative effect. Since the mass stored in the fuel gas tank is usually also determined based on the tank temperature, high measurement tolerances may further lead to an incorrectly calculated tank level or an incorrectly calculated residual range.

It is therefore desirable for both purposes to obtain the most accurate information as to the temperature in a fuel gas tank. However, the locally occurring maximum temperature is decisive for adhering to the temperature limit, while the average temperature is more suitable for calculating the stored mass. It is difficult to reconcile these two wishes. This applies in particular because thermocouples, thermistors, or temperature resistors are usually used for temperature measurement, which can only sense the temperature in their immediate vicinity. Due to the limited accessibility of the tank interior, the choice of sensor position is also severely restricted.

US 2010/0032934 A1 provides an example of a fuel gas tank with a tank line and a tank valve for filling the fuel gas tank with fuel gas and a sensor located on the tank line for sensing a state variable of the fuel gas. The sensor is positioned in such a way that it is outside the pressure jet which forms when the fuel gas tank is filled with fuel gas. This is intended to increase the measuring accuracy of the sensor.

SUMMARY

The present invention is designed to ensure compliance with a specified temperature limit when filling a storage volume of a fuel gas tank with fuel gas in order to avoid overloading the fuel gas tank.

Proposed in order to achieve said object are the method according to the disclosure and the fuel gas tank according to the disclosure. Furthermore, a fuel gas tank system having at least one fuel gas tank according to the present invention is provided.

In the proposed method of filling a storage volume of a fuel gas tank with fuel gas, the fuel gas is introduced into the storage volume via a fueling path with an integrated tank valve. The temperature of the fuel gas is detected with the aid of a sensor integrated in the fueling path, in the area of a bottleneck, which is formed by the sensor and/or a holding body on which the sensor is mounted.

Typically, the flow of the fuel gas introduced into the storage volume is first decelerated or dammed by a wall surrounding the storage volume, which results in the fuel gas heating up locally and significantly in the area of the wall. In this case, local maximum temperatures may occur that exceed an admissible limit value so that there is a risk of overloading the fuel gas tank. With the aid of the proposed method and the artificial bottleneck point formed within the fueling path, the development of a local maximum temperature—far away from the wall—is moved into the fueling path and detected using the sensor arranged therein. In this way, compliance with a specified temperature limit may be monitored more easily and reliably to avoid overloading the fuel gas tank.

In further development of the invention, it is proposed that the measured values of the sensor be compared to a pre-determined temperature limit value and that if the temperature limit value is exceeded, the fueling procedure is discontinued or interrupted. These further steps serve to safely prevent overloading the fuel gas tank. The pre-determined temperature limit is preferably still below the limit value specified by the material of the fuel gas tank.

Preferably, with the aid of a further sensor, the temperature of the fuel gas is detected outside the area of the bottleneck point, for example in the storage volume, and the mean and/or differential value is determined from the measured values of both sensors. While the sensor disposed in the area of the bottleneck point senses a local maximum temperature or the "total temperature", the "static temperature" can be sensed with the help of the further sensor. The further sensor is arranged outside the area of the bottleneck point for this purpose. By averaging, the measured values of both sensors may then be used to determine the average temperature in the fuel gas tank needed to calculate the stored mass. By determining a differential value, the flow rate of the fuel gas when filling the storage volume with fuel gas can also be determined. From the flow rate of the fuel gas, the mass flow rate or the mass of the fuel gas introduced into the storage volume can then be calculated.

As a further measure, it is therefore suggested that the flow rate of the fuel gas during a fueling operation is derived from the differential value.

During a fueling operation, there is a large difference between the total temperature and static temperature. That is to say, the difference between the measured values of the two sensors is great. The reverse is true during an emptying operation, provided that the fueling path is not also used for emptying. If the difference is small or the measured values of both sensors are close to one another, this information can be used to plausibly verify an emptying process.

If, after a fueling operation, a significantly increased temperature occurs at the first sensor, an uncontrolled "refueling operation" may be assumed within a fuel gas tank system having multiple fuel gas tanks. That is to say, fuel gas tank is flowing from another fuel gas tank. In that case, the tank valve may be actuated or closed such that the predetermined temperature limit is not exceeded.

The first sensor for sensing the total temperature is preferably integrated into the fueling path such that, upon reversing the direction of flow of the fuel gas in the fueling path, it only measures the static portion of the temperature. That is, the flow fuels directly towards the first sensor in only one direction, namely in the filling direction. The holding body in particular, which shields the sensor when the direction of flow is reversed in the fueling path, can in particular prevent the fuel from flowing directly towards the sensor in the flow direction which is the reverse of the filling direction.

The ratio of the total temperature to the static temperature will depend on the specific geometry of and/or connection between the two sensors. Calibration may reduce any errors in the measurement signals from the two sensors, so that the measurement accuracy continues to increase.

Furthermore, a fuel gas tank for a fuel gas tank system is proposed. The fuel gas tank has a storage volume that can be filled with fuel gas via a fueling path with an integrated tank valve. Further, the fuel gas tank comprises a sensor integrated into the fueling path for sensing the temperature of the fuel gas, wherein the sensor and/or a holding body on which the sensor is mounted form a bottleneck point in the fueling path in which a measurement area of the sensor is disposed. That is to say, the temperature of the fuel gas is measured in the area of the bottleneck point so that the total temperature can be sensed with the aid of the sensor.

Accordingly, the proposed fuel gas tank may be used to perform the method according to the invention described above. The fuel gas tank can therefore achieve the same advantages as with the aid of the method according to the invention described above.

Preferably, the sensor and/or the holding body have a face surface that is aligned substantially perpendicular to the direction of flow of the fuel gas in the fueling path when filling the storage volume with fuel gas. During filling, the fuel gas is therefore dammed at the face surface so that the face surface of the sensor and/or the holding body forms the bottleneck point. In order to sense the temperature of the fuel gas in the area of the bottleneck point, preferably the face surface of the sensor simultaneously forms the measuring are of the sensor.

In further development of the invention, a further sensor is integrated into the fueling path or into the storage volume outside the area of the bottleneck point. With the help of the further sensor, the static temperature in the fuel gas tank is sensed because it is positioned outside the area of the bottleneck point. From the total temperature measured with the aid of the first sensor and the static temperature measured with the aid of the further sensor, a mean and/or differential value may be calculated. The average value provides information about the average temperature in the fuel gas tank required for calculating the stored mass. The flow rate of the fuel gas in the filling direction may be determined from the differential value.

When the further sensor is integrated into the fueling path, it is preferably arranged or aligned so that the fuel gas does not flow directly towards it, but rather the fuel gas is guided past the sensor. In contrast to the first sensor, the formation of a bottleneck point must be avoided in the area of the further sensor. The sensor may be arranged substantially parallel to the direction of flow of the fuel gas. Alternatively, the further sensor may be located not only outside the area of the bottleneck point but also outside the fueling path to ensure that the static temperature is taken more closely into account.

Furthermore, it is proposed that the two sensors are connected via the holding body. The holding body thus facilitates the assembly of the sensors.

Further preferably, at least sections of the fueling path are guided through a pipe projecting into the storage volume. The pipe specifies a filling direction. Further, the pipe has a defined flow cross section that simplifies the formation of the bottleneck point by the first sensor and/or the holding body. The first sensor and/or the holding body are integrated in the pipe for this purpose, preferably in such a way that an face surface is aligned in the filling direction perpendicular to the direction of flow of the fuel gas.

Advantageously, the fueling path, the tank valve and the at least one sensor form a tank unit that is inserted into, in particular, screwed into, an opening in a wall surrounding the storage volume on the face side, preferably in a central location. As a tank unit, all components can be pre-assembled and inserted into the fuel gas tank as a pre-assembled unit, so that assembly is simplified. At the same time, construction space can be saved. Further components may also be mounted on the tank unit, for example a further valve and/or a further sensor. Further, the tank unit may comprise a pipe projecting into the reservoir volume, through which at least sections of the fueling path are guided, in particular an end section of the fueling path.

Furthermore, a fuel gas tank system is proposed which comprises at least one fuel gas tank according to the invention. For example, several similar fuel gas tanks can be connected in a parallel arrangement via a common frame. The frame facilitates the installation of the fuel gas tank system in a vehicle, for example in a fuel cell vehicle.

BRIEF DESCRIPTION OF THE DRAWINGS

Preferred embodiments of the invention are described in greater detail hereinafter with reference to the accompanying drawings. Shown are.

DETAILED DESCRIPTION

Figure 1:
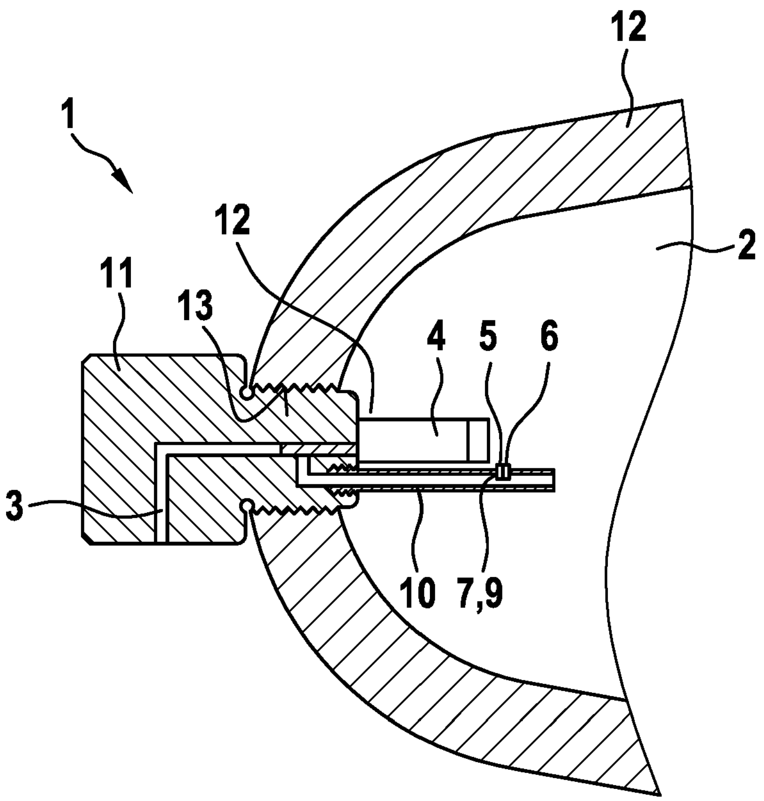
FIG. 1 a schematic longitudinal section through a fuel gas tank according to the invention in the area of a tank unit, FIG. 2*a*)-*d*) each a schematic longitudinal section through a holding body with two sensors for a fuel gas tank according to the invention, FIG. 3 a schematic longitudinal section through a pipe with an integrated holding body and two sensors, as well as FIG. 4 a schematic longitudinal section through a pipe with an integrated holding body and two sensors.

The fuel gas tank 1 shown in FIG. 1 comprises a wall 12 enclosing a storage volume 2 with an opening 13 on the face side into which a tank unit 11 is inserted. A fueling path 3 with an integrated tank valve 4 leads through the tank unit 11 for filling the fuel gas tank 1 with fresh fuel gas. An end section of the fueling path 3 is defined by a pipe 10 projecting into the storage volume 2. Since fuel gas, for example hydrogen, heats up significantly when introduced into the storage volume 2, the temperature of the fuel gas is monitored using sensors 5, 6. A first sensor 5 is used to sense the total temperature, and a second sensor 6 is used to sense the static temperature.

To sense the total temperature, i.e. a locally occurring maximum temperature, the first sensor 5 is integrated into the pipe 10 in such a way that it comes to lie in the fueling path 3 and fuel gas flows directly towards it in the filling direction. The fuel gas accumulates on a face surface 9 of the sensor 5 which is aligned perpendicular to the direction of flow of the fuel gas, so that a bottleneck point 7 is formed by the face surface 9. The second sensor 6 for sensing the static temperature is also integrated in the pipe 10, but is oriented such that the fuel does not flow directly towards it in the filling direction. That is, the second sensor 6 does not form a bottleneck point, but rather the fuel gas can pass by freely.

Of the two sensors 5, 6, at least one sensor 5, 6 can be indirectly attached to the pipe 10 via a holding body 8. This is particularly true for the first sensor 5, since the holding body 8 allows for positioning of the sensor 5 as central as possible with respect to the fueling path 3, so that the fuel flows well against the sensor 5. Depending on the configuration of the holding body 8, the second sensor 6 can also be integrated therein. Exemplary embodiments can be found in FIGS. 2*a*) to 2*d*). These show that the second sensor 6 is respectively disposed in the direction of flow of the fuel gas downstream of the first sensor 5, specifically at an angle, in particular perpendicular, so that fuel gas can flow by freely. To optimize flow in the filling path 3, the holding body 8 upstream of the second sensor 6 can have an outer contour which tapers in the filling direction, for example, in a conical fashion. If the direction of flow of the fuel gas in the fueling path 3 reverses, it is simultaneously ensured via the outer contour of the holding body 8 that the fuel gas will flow past the first sensor 5, so that it also only senses the static temperature.

Figure 2:
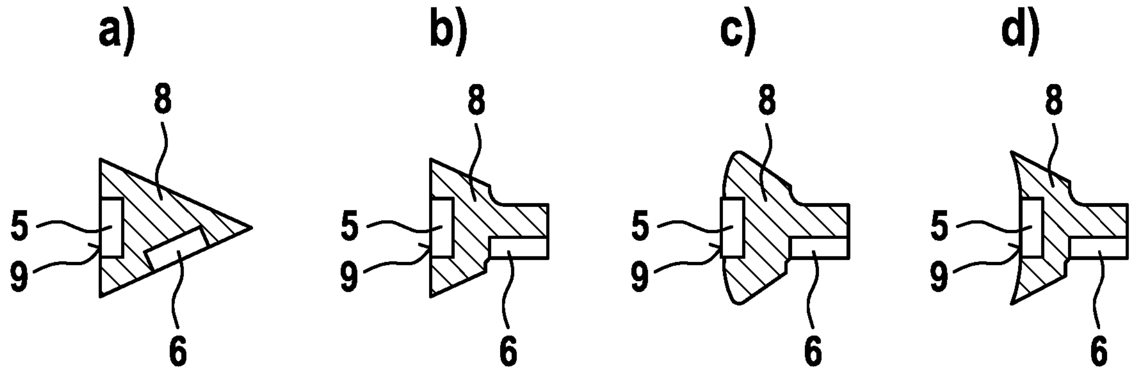

The first sensor 5 is preferably integrated in the holding body 8 such that the face surface 9 of the sensor 5 simultaneously forms the upstream surface 9 of the holding body 8. This can also be embodied as shown in FIGS. 2*a*) and 2*b*). However, the face surface 9 can also be convex in accordance with FIG. 2*c*) or concave in accordance with FIG. 3*d*). The flow can also be optimized via the shape of the contact surface 9.

Figure 3:
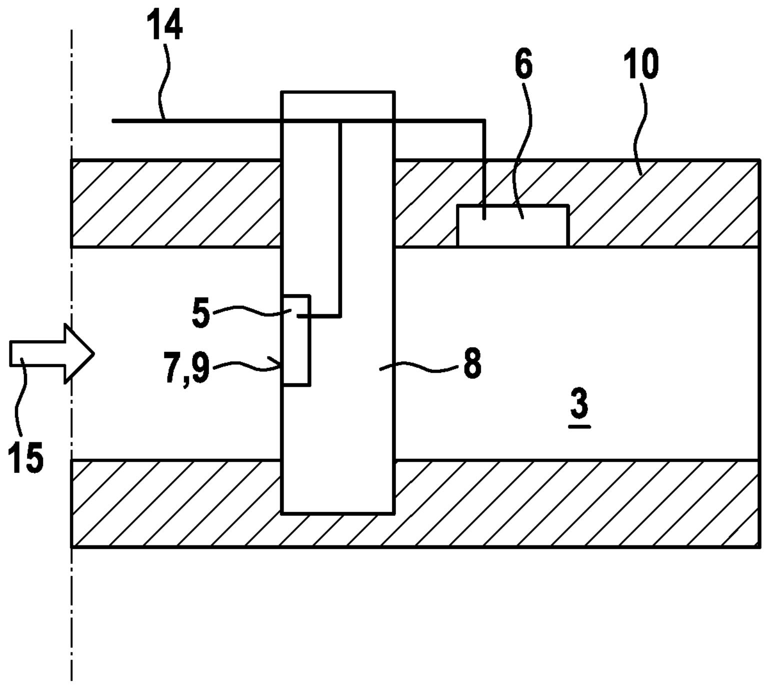

FIG. 3 shows a further holding body 8 with a sensor 5 for sensing the total temperature. The holding body 8 is integrated in the pipe 10 and extends perpendicular to the direction of flow 15 of the fuel gas. As FIG. 3 shows, a connecting wire 14 can be guided via the holding body 8 up to the sensor 5 to realize the necessary electrical connection of the sensor 5. The second sensor 6 for sensing the static temperature is integrated inside the pipe 10 so that the flow cross section through the second sensor 6 is not restricted. The flow of fuel gas thus passes by the second sensor 6. The connecting wire 14 of the second sensor 6 is guided to the outside through the holding body 8.

Figure 4:
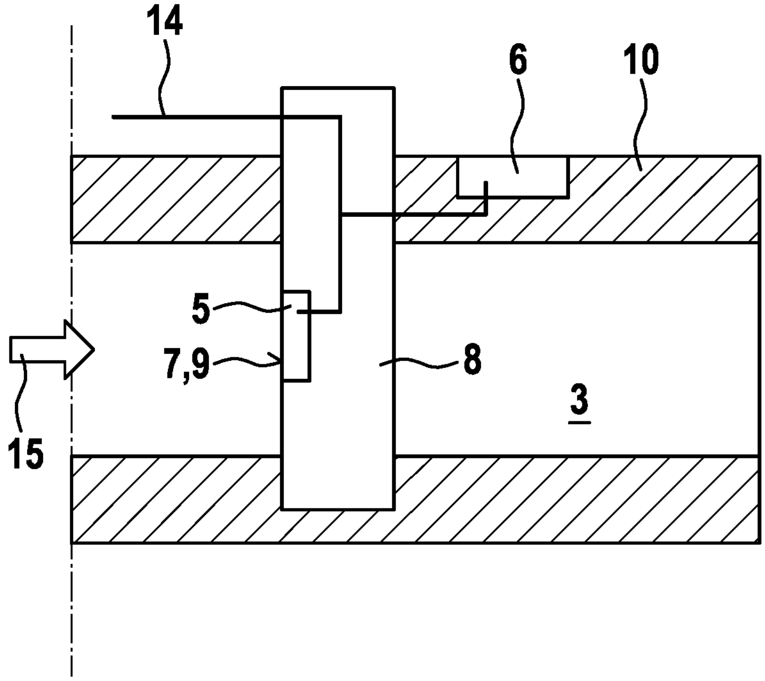

The exemplary embodiment of FIG. 4 differs from that of FIG. 3 only in that the second sensor 6 is integrated in the pipe 10 on the outside, so that the static temperature of the fuel gas in the storage volume 2 is sensed with the help of the second sensor 6. The connecting wire 14 is also guided to the outside through the holding body 8.

The invention claimed is:

1. A method of filling a storage volume (2) of a fuel gas tank (1) with fuel gas, in which the fuel gas is introduced into the storage volume (2) via a fueling path (3) with an integrated tank valve (4), and a temperature of the fuel gas is sensed with a sensor (5) integrated in the fueling path (3) in an area of a bottleneck point (7), which is formed by the sensor (5) and/or a holding body (8) on which the sensor (5) is mounted.

2. The method according to claim 1,
wherein measured values of the sensor (5) are compared to a pre-determined temperature limit, and if the pre-determined temperature limit is exceeded, the filling operation is discontinued or interrupted.

3. The method according to claim 1,
wherein the temperature of the fuel gas is sensed outside the area of the bottleneck point (7) with a further sensor (6), and a mean and/or differential value is determined from measured values of both sensors (5, 6).

4. The method according to claim 3,
wherein a flow rate of the fuel gas is derived from the differential value.

5. The method according to claim 3, wherein the further sensor (6) is located in the storage volume (2).

6. A fuel gas tank (1) for a fuel gas tank system, the fuel gas tank (1) comprising a storage volume (2), which can be filled with fuel gas via a fueling path (3) with an integrated tank valve (4), further comprising a sensor (5) integrated in the fueling path (3) for sensing a temperature of the fuel gas, wherein the sensor (5) and/or a holding body (8) on which the sensor (5) is mounted form a bottleneck point (7) in the fueling path (3), wherein a measuring area of the sensor (5) is arranged in the bottleneck point (7).

7. The fuel gas tank (1) according to claim 6,
wherein the sensor (5) and/or the holding body (8) comprise a face surface (9), which is aligned substantially perpendicular to a direction of flow (15) of the fuel gas in the fueling path (3) when filling the storage volume (2) with fuel gas.

8. The fuel gas tank (1) according to claim 6,
wherein a further sensor (6) is integrated into the fueling path (3) or into the storage volume (2) outside the bottleneck point (7).

9. The fuel gas tank (1) according to claim 6,
wherein the fueling path (3) is guided at least in sections through a pipe (10) projecting into the storage volume (2).

10. The fuel gas tank (1) according to claim 6,
wherein the fueling path (3), the tank valve (4), and the sensor (5, 6) form a tank unit (11) that is inserted into an opening (13) on a face side of a wall (12) surrounding the storage volume (2).

11. The fuel gas tank (1) according to claim 10, wherein the tank unit (11) is screwed into the opening (13).

12. The fuel gas tank (1) according to claim 10, wherein the opening (13) is centrally located on the face side of the wall (12) surrounding the storage volume (2).

13. A fuel gas tank system comprising at least one fuel gas tank (1) according to claim 6.

* * * * *